(12) United States Patent
Hamacher

(10) Patent No.: US 6,408,255 B1
(45) Date of Patent: Jun. 18, 2002

(54) SPACECRAFT

(75) Inventor: Hans Hamacher, Roesrath (DE)

(73) Assignee: Deutsches Zentrum fuer Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/374,110

(22) Filed: Aug. 16, 1999

(30) Foreign Application Priority Data

Sep. 24, 1998 (DE) .......................................... 198 43 774

(51) Int. Cl.[7] .................................................. G01M 9/06
(52) U.S. Cl. ...................................... 702/115; 702/188
(58) Field of Search ............................. 702/115, 34, 35, 702/31, 57, 58, 96, 104, 113, 116, 121, 141, 142, 144, 188

(56) References Cited

U.S. PATENT DOCUMENTS

| 3,792,270 A | * | 2/1974 | Elmore ................... 250/83.3 R |
| 4,749,157 A | * | 6/1988 | Neufeld ........................ 244/171 |
| 5,067,099 A | * | 11/1991 | McCown et al. ........... 702/183 |
| 5,109,346 A | * | 4/1992 | Wertz ......................... 701/226 |
| 5,130,931 A | * | 7/1992 | Paluszek et al. ............. 701/226 |
| 5,611,505 A | * | 3/1997 | Smay .......................... 244/165 |
| 5,796,612 A | * | 8/1998 | Palmer ........................ 702/144 |
| 5,951,609 A | * | 9/1999 | Hanson et al. ................ 701/13 |
| 5,996,941 A | * | 12/1999 | Surauer et al. ............. 244/165 |
| 6,135,393 A | * | 10/2000 | Sackheim et al. .......... 244/169 |

* cited by examiner

Primary Examiner—Marc S. Hoff
Assistant Examiner—Edward Raymond
(74) Attorney, Agent, or Firm—Diller, Ramik & Wight

(57) ABSTRACT

A device for determining the operational condition of a mechanical apparatus (11–15) mounted in or to a spacecraft (10) which includes an acceleration pickup (20) attached to the spacecraft (10) for measuring the acceleration of the spacecraft (10), and an operational condition determination device with a memory for prestored known acceleration patterns of the apparatus (11–15). The acceleration patterns or parameters of the spacecraft (10) detected by the acceleration pickup (20) are compared with the known acceleration patterns or parameters of the apparatus (11–15) from the memory to determine the operational condition of the apparatus (11–15).

16 Claims, 2 Drawing Sheets

SPACECRAFT

BACKGROUND OF THE INVENTION

The invention relates to a spacecraft which includes an acceleration pickup for determining accelerations of the spacecraft, and to a process and a device for determining the operational condition of mechanical apparatuses mounted to or in the spacecraft.

A plurality of apparatuses are mounted in and/or to spacecraft whose operational conditions must be continuously monitored. Knowledge of the operational conditions of said apparatuses is important for various reasons. The apparatuses produce various types of interferences which may affect, for example, highly sensitive scientific experiments and measurements. Monitoring of the operational conditions of the apparatuses may also serve for measuring the service hours and monitoring the overall functionality of the spacecraft. The operational conditions are monitored by measuring electrical and physical operating variables of the apparatuses which require a plurality of electrical components, such as pickups, transducers, data lines etc., which make monitoring of the apparatuses complicated and susceptible to interference and fault.

SUMMARY OF THE INVENTION

The present invention is directed to a spacecraft, and a process and a device for easily monitoring mechanical apparatuses in and/or on the spacecraft.

Spacecraft, such as scientific spacelabs, are provided with highly sensitive acceleration pickups capable of measuring even minimum accelerations of the spacecraft. Such acceleration pickups are essentially employed for detecting and recording the so-called microgravitation, i. e., accelerations in the range of fractions of the acceleration due to gravity (g=9.81 m/sec$^2$), when scientific experiments are carried out at zero-gravity in order to accurately document the boundary conditions of the experiments in terms of the occurring accelerations. Besides the gravitation force and the counteracting centrifugal force, the vibrations of operating mechanical apparatuses produce measurable periodic accelerations of the spacecraft.

According to the invention the acceleration pickup is additionally used in the spacecraft to determine the operational condition of at least one mechanical apparatus mounted in and/or to the spacecraft. A mechanical apparatus is an apparatus which comprises a mechanical component, e. g. a motor, compressor or other mechanism, carrying out a mechanical movement which produces accelerations in the form of vibrations, oscillations, etc. Such accelerations are transmitted to the spracecraft body by mechanical coupling of the apparatus to the spacecraft so that the accelerations produced by the mechanical apparatus can be detected at a different location in the spacecraft by the acceleration pickup installed in or to the spacecraft body. The operational condition of the apparatus is thus determined by the acceleration pickup which determines whether or not accelerations typical of the mechanical apparatus exist.

In this way the operational condition of a mechanical apparatus can be determined by the existing acceleration pickups without any sensors having to be attached to the mechanical apparatus or without electrical operating variables of the apparatus having to be monitored. The detectable operational condition of an apparatus may be "Switched on", "Switched off", "Slow mode" or "Fast mode" relative to the respective mechanical components of the apparatus. In this way monitoring of the operational condition of a mechanical apparatus is effected and does not require any direct electrical or electromagnetical connection to the apparatus and is thus completely independent of other control and operational information of the mechanical apparatus. This type of apparatus monitoring is thus easy to realize and extremely reliable due to its independence.

In a preferred embodiment of the invention detection of the operational condition of the apparatus is effected by a comparison of the occurring acceleration pattern or parameters derived therefrom with prestored acceleration patterns or parameters of the apparatus being monitored. The acceleration patterns may, for example, be stored as derived frequency spectra of the apparatus in operation. The measured acceleration curve of the spacecraft is split up into a frequency spectrum and compared with the stored acceleration patterns or frequency spectra of the apparatus with the aid of a computer-assisted pattern recognition software. The degree of conformity of the measured acceleration patterns or spectra with the prestored acceleration patterns or spectra indicates the operational condition of the apparatus.

Preferably the operational conditions of a plurality of apparatuses are monitored by a comparison of the occurring acceleration patterns with the prestored acceleration patterns of all apparatuses. In this way a single acceleration pickup is capable of simultaneously monitoring a plurality of apparatuses. The measured acceleration pattern and parameters derived therefrom are compared with the prestored acceleration patterns and parameters of all apparatuses being monitored. On the basis of conformity or nonconformity of the stored apparatus pattern with the detected acceleration pattern the operational conditions of a plurality of apparatuses can be determined.

When applying the process of the invention for determining the operational condition of a mechanical apparatus mounted to or in a spacecraft, first the acceleration of the spacecraft is measured, then an acceleration pattern of the spacecraft is determined from the measured acceleration values of the spacecraft and the detected acceleration pattern of the spacecraft is evaluated to ascertain the operational condition of the apparatus by comparing the determined acceleration pattern with known acceleration patterns of the apparatus. Thus, a process is provided which allows the operational condition of the apparatus, e. g., operation or nonoperation, to be determined without direct detection of operational variables of the apparatus. Furthermore, the process is designed to monitor the functioning of the apparatus independent of direct information from the apparatus.

Preferably this process serves for monitoring a plurality of apparatuses with the detected acceleration patterns of the spacecraft being compared with known acceleration patterns of all apparatuses and the respective operational condition of each apparatus being determined.

The device according to the invention for determining the operational condition of a mechanical apparatus mounted in or to the spacecraft comprises an acceleration pickup attachable to the spacecraft for measuring the acceleration of the spacecraft, and an operational condition determination device with a memory for storing known acceleration patterns of the apparatus, with the acceleration patterns of the spacecraft detected by the acceleration pickup being compared with the known acceleration patterns of the apparatus from the memory and the operational condition of the apparatus being determined on the basis of the degree of conformity of the two patterns.

Thus, the device detects the operational condition of the apparatus on the basis of the mechanical vibrations induced by the apparatus onto the spacecraft. The acceleration pickup detects both the acceleration acting upon the spacecraft from outside and caused by the gravitation force and the centrifugal force, and the accelerations of the spacecraft body produced by the apparatuses mounted to or in the spacecraft, which normally occur in the form of vibrations and oscillations having specific patterns and frequencies.

To determine the operational condition of the apparatus, parameters derived from the acceleration patterns, e. g., time-resolved frequency spectra, may be compared with each other.

Preferably an acceleration pickup comprises three acceleration detectors which detect the accelerations of the three space axes.

In a preferred embodiment of the invention the device for monitoring a plurality of apparatuses is configured in such a way that the determination device compares the acceleration patterns of the spacecraft with the known acceleration patterns of the apparatuses stored in the memory and determines therefrom the respective operational condition of each apparatus. In this way a single acceleration pickup can monitor the operational conditions of a plurality of apparatuses.

Preferably, a plurality of acceleration pickups is provided whose measured values are acquired and evaluated by the determination device for determining the operational condition of the apparatus. By the employment of a plurality of acceleration pickups even larger spacecraft can be monitored with detection gaps being avoided so that all apparatuses of the spacecraft producing vibrations are covered.

In a preferred embodiment of the invention the determination device is configured in such a way that it also determines the wear condition of the apparatus by comparing the acceleration patterns of the spacecraft with the known acceleration patterns of the apparatus. Wear of the apparatus frequently causes unbalances, frictional changes, etc. Such changes result in a change in the oscillatory response of the apparatus. The deviations in the oscillatory response are detected by the determination device and recognized as wear of the apparatus. In this way it is, for example, possible to carry out maintenance of the apparatus in dependence on the wear and an imminent apparatus failure can be recognized in due time.

Preferably, the determination device is capable of receiving operating data of the apparatus, which are also evaluated by the determination device to determine the operational and wear conditions of the apparatus. The determination device is supplied, for example, with electrical operating data and parameters of the apparatus besides the acceleration patterns so that determination of the operational and wear conditions can be realized with high reliability and redundance.

In a preferred embodiment of the invention a transmission device is utilized for wireless transmission of the operational and wear conditions of the apparatus, as ascertained by the determination device to a receiving device. The transmission device is capable of transmitting the information on the determined operational conditions, for example, from the spacecraft to a receiving device on earth so that the transmitted information can be further evaluated.

In a preferred embodiment of the invention a recording device for continuous recording of the acceleration values of the spacecraft is provided. In this way the acceleration acting from outside on the spacecraft can be documented so that during scientific experiments the boundary conditions regarding the prevailing acceleration are always known and can be reconstructed after completion of the experiments.

BRIEF DESCRIPTION OF THE DRAWINGS

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
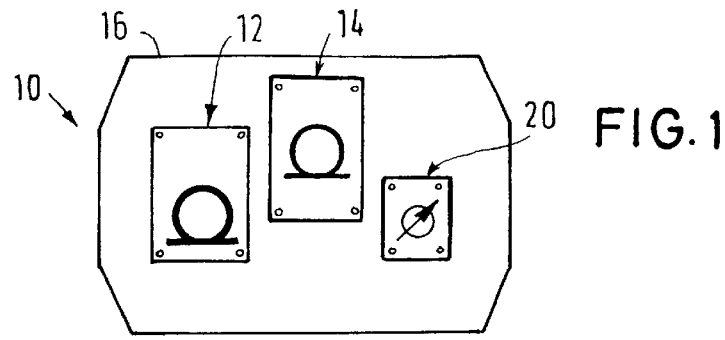
FIG. 1 is a highly schematic view of a spacecraft, and illustrates a mechanical apparatuses and an acceleration pickup carried by the spacecraft.

FIG. 1 a spacecraft 10 includes a spacecraft body 16 having a side wall 22 to which is mounted mechanical apparatuses 11–15 and an acceleration pickup 20. The mechanical apparatuses 11–15 are apparatuses with movable mechanical elements, such as motors, pumps, cooling units etc. which, in switched-on condition, inevitably produce at least minor vibrations, i. e., accelerations, and transfer them to the spacecraft body side wall 22 (FIG. 2).

The acceleration pickup 20 serves on the one hand for continuous measuring and recording of all accelerations of the spacecraft 10 to be capable of recording the exact boundary conditions with regard to microgravitation, i. e., the accelerations in the range of fractions of the acceleration due to gravity g. On the other hand, the acceleration pickup 20 serves for monitoring the operational conditions of the mechanical apparatuses 11–15. Thus, both accelerations acting from outside upon the spacecraft 10 and the accelerations produced in and on the spacecraft, which are induced, inter alia, by the mechanical apparatuses 11–15 onto the spacecraft body 16 and/or the sidewall 22, are detected by the acceleration pickup 20.

By comparing the frequency spectra of the accelerations detected by the acceleration pickup 20 with prestored frequency spectra of the mechanical apparatuses 11–15 it can be determined whether or not one or both of the mechanical apparatuses 11–15 are in operation. If the occurring frequency spectrum of the measured acceleration conforms or does not conform to a certain extent with the stored frequency spectrum of the mechanical apparatus 11–15 being monitored, "Operation" or "Nonoperation" of the apparatus is ascertained. In this way the operational condition of the mechanical apparatuses 11–15 in the spacecraft 10 is monitored and may be recorded without any direct electrical connections to the respective apparatuses 11–15.

Figure 2:
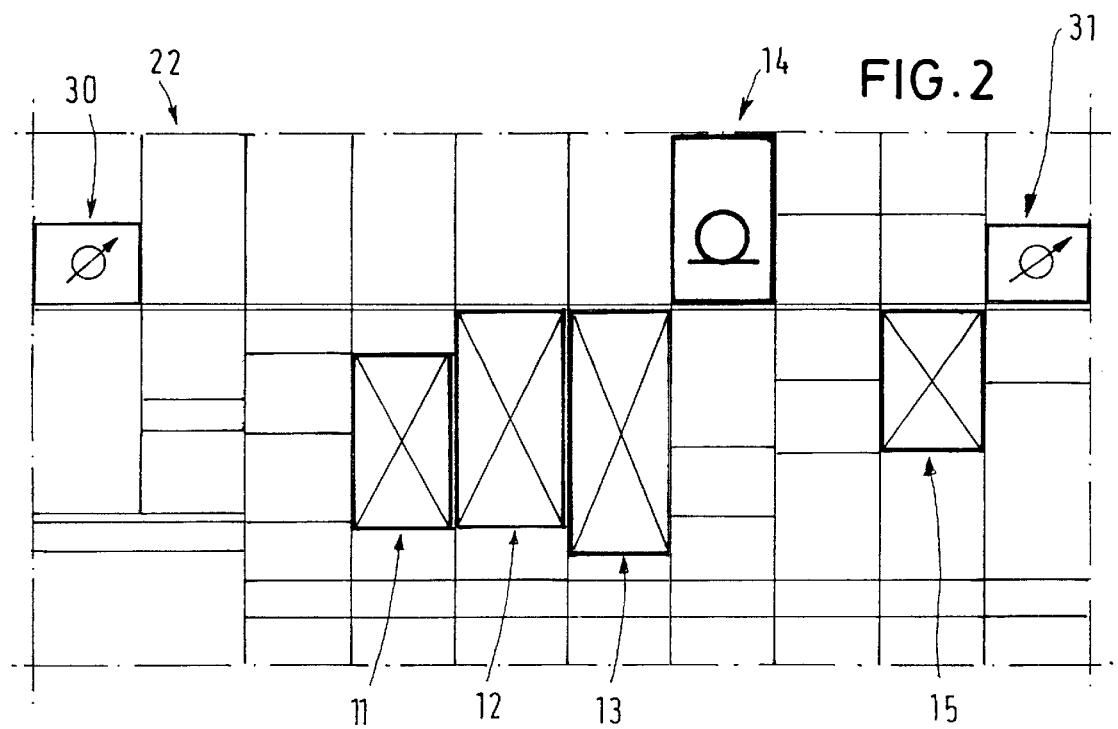
FIG. 2 is a diagrammatic schematic view, and illustrates a wall of the spacecraft housing a plurality of apparatus modules and two acceleration measuring modules.

In FIG. 2 the side wall 22 of the spacecraft, such as a "space lab", preferably mounts each of the apparatuses 11–15 by conventional plug-in connectors which permits the individual apparatuses or apparatus modules 11–15 to be readily attached to and removed from the side wall 22. Such conventional plug-in connectors are also utilized to mount accelerations measuring modules 30, 31 to the side wall 22. The vibrations or accelerations produced by the mechanical apparatuses of the apparatus modules 11–15 are transmitted via the frame of the side wall 22 to the two acceleration measuring modules 30, 31 so that these vibrations can be measured as accelerations by the acceleration measuring modules 30, 31.

Figure 3:
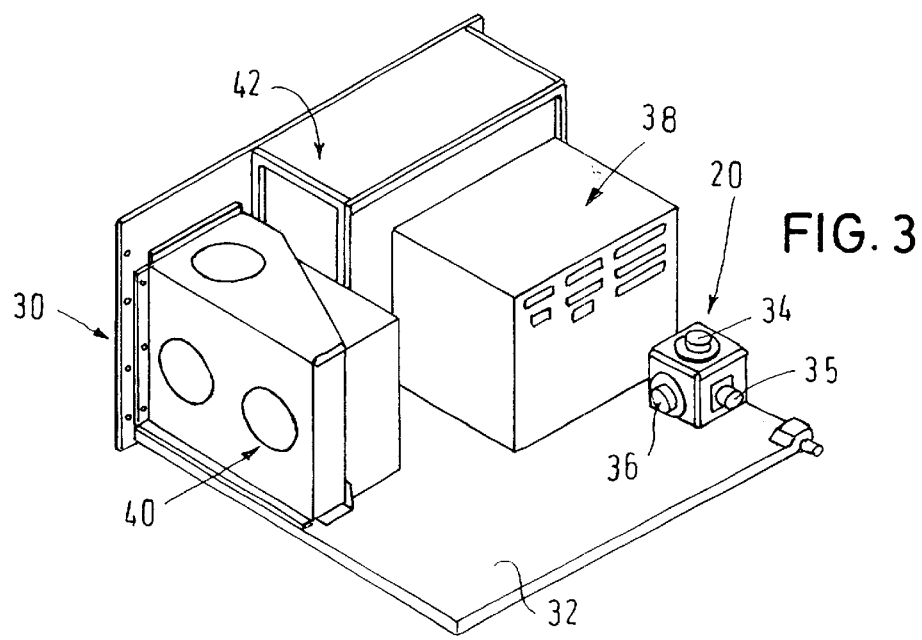
FIG. 3 is a diagrammatic top perspective view, and illustrates an acceleration measuring module of FIG. 2 and an acceleration pickup including three acceleration detectors.

In FIG. 3 the rear of the acceleration measuring module 30 has the acceleration pickup 20 arranged on a baseplate 32 for detecting the acceleration of the side wall 16 containing the apparatuses 11–15 or of the spacecraft 10 in all three space axes using three acceleration detectors 34, 35, 36.

The acceleration pickup 20 or the three acceleration detectors 34, 35, 36 detect accelerations in the frequency range of approximately 1 to 100 Hz or more at a sensitivity of approximately $10^{-5}$ g.

Furthermore, the acceleration measuring module 30 includes an evaluation unit 38, a memory unit 40 and a display unit 42. In the evaluation unit 38 the acceleration signals received by the acceleration pickup 20 are amplified and split up into a frequency spectrum. This results in frequency spectra of a frequency range of 0–100 Hz or more which are produced at a predetermined interval, e. g. once per second. In the evaluation unit 38 the operating frequency spectra of all mechanical apparatuses 11–15 mounted on the side wall 22 are prestored in a memory.

The evaluation unit 38 further includes an operational condition determination device which determines and indicates the operational condition of the apparatuses 11–15 in dependence on a pattern comparison carried out with the aid of neuronal nets, Kalman filtration, etc.

The measured frequency spectra of the spacecraft 10 are continuously compared with the stored frequency spectra of the apparatuses and the result of the comparison is generated. At a certain degree of conformity of the frequency spectra of the spacecraft 10 with the frequency spectra of the apparatuses 11–15 a corresponding operating signal for the respective apparatus is generated, otherwise a corresponding nonoperating signal is granted for the respective apparatus 11–15. The determined frequency spectra of the spacecraft 10 are continuously compared with the stored frequency spectra of all apparatuses 11–15 so that the operational conditions of all apparatuses 11–15 are permanently checked.

Figure 4A:
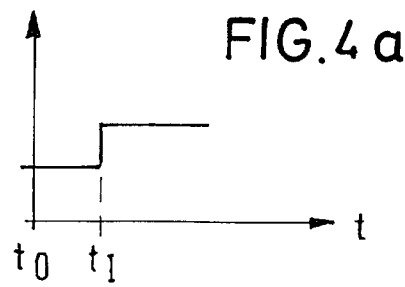
FIG. 4a is a graph, and illustrates a curve created by plotting measured acceleration versus time.

In FIG. 4a the acceleration pattern or graph of the spacecraft 10 is displayed over time t in terms of time as it is, for example, recorded for documentation of the boundary conditions for scientific zero-gravity experiments. The figure shows the amount of the geometrical sum of the amplitudes of all three acceleration detectors 34, 35, 36 of the occurring acceleration versus time t. The occurring and measured acceleration is thus evaluated independently of the direction. However, the occurring acceleration may also be determined and evaluated in the form of acceleration components in dependence on the direction.

Figure 4B:
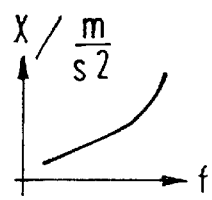
FIG. 4b is a graph, and illustrates a curve created by plotting the frequency spectrum of the acceleration of FIG. 4a when the mechanical apparatus is not in operation.
Figure 4C:
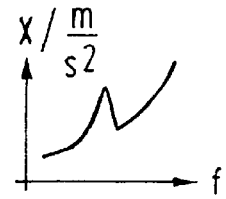
FIG. 4c is a graph, and illustrates a curved created by plotting the frequency spectrum of the acceleration of FIG. 4a when the mechanical apparatus is in operation.

FIG. 4b shows a graph of the frequency spectrum before time $t_f$ with the apparatus not being in operation, while FIG. 4c shows a graph of the frequency spectrum after time $t_f$, i. e., after a mechanical apparatus has been switched on.

Figure 5:
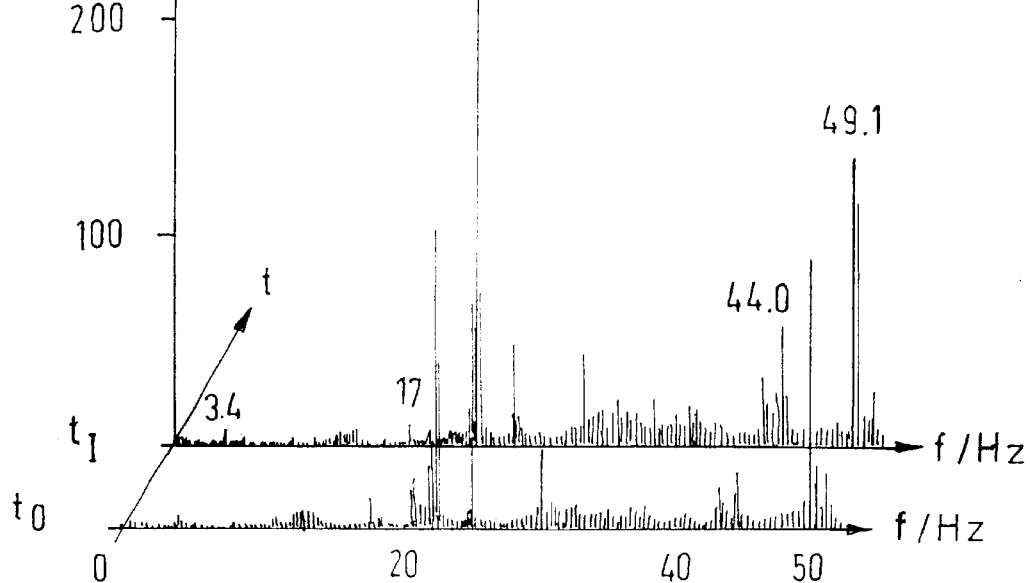
FIG. 5 is a graph, and illustrates a time-resolved frequency spectrum of a mechanical apparatus at various operational conditions.

FIG. 5 provides a detailed representation of the frequency spectra of the times $t_0$ and $t_f$. As can be clearly seen, large acceleration amplitudes occur at 22.0 Hz and 49.1 Hz when a mechanical apparatus is switched on ($t_f$), which are typical of this apparatus. The acceleration pattern stored for this apparatus displays characteristic acceleration peaks in the range of 22.0 Hz and 49.1 Hz so that a pattern comparison of the frequency spectrum of the spacecraft at time $t_f$ with the stored operating frequency spectrum of the apparatus results in a high degree of conformity.

The evaluation unit 38 receives via corresponding electrical data lines operating signals from the apparatus modules 11–15 being monitored so that, together with the evaluation of the occurring accelerations, a redundant system for monitoring the operational conditions of the apparatuses 11–15 is effected.

The evaluation unit 38 can also determine the wear condition of the mechanics of the apparatus modules 11–15 by determining the degree of conformity with the pattern. In this way an imminent failure of the apparatuses 11–15 can be reliably ascertained so that resultant risks and extended outage times are effectively avoided.

The display unit 42 displays the operational conditions of the apparatus modules 11–15 and the memory unit 40 stores all measured and determined data which are transmitted by the spacecraft 10 via a transmission device from space to earth where they are further evaluated.

Although a preferred embodiment of the invention has been specifically illustrated and described herein, it is to be understood that minor variations may be made in the apparatus without departing from the spirit and scope of the invention, as defined by the appended claims.

What is claimed is:

1. A spacecraft comprising at least one acceleration pickup (20) determining the accelerations of the spacecraft (10),
wherein
    the acceleration pickup (20) is additionally used to determine the operational condition of at least one mechanical apparatus (11–15) mounted in or to the spacecraft (10).

2. The spacecraft according to claim 1, wherein the operational condition of the apparatus (11–15) is determined by comparing the occurring acceleration patterns or parameters derived therefrom with prestored acceleration patterns or parameters derived therefrom of the the apparatus (11–15) to be monitored.

3. The spacecraft according to claim 2, wherein the operational conditions of a plurality of apparatuses (11–15) are monitored by comparing the occurring acceleration patterns or parameters derived therefrom with prestored acceleration patterns or parameters derived therefrom of all apparatuses (11–15).

4. A process for determination of the operational condition of a mechanical apparatus (11–15) mounted to or in a spacecraft (10), with the following steps:
    Measuring the acceleration of the spacecraft (10),
    Detecting an acceleration pattern from the measured acceleration values of the spacecraft (10), and
    Evaluating the detected acceleration pattern of the spacecraft (10) for determining the operational condition of the apparatus (11–15) by comparing the determined acceleration pattern or parameters derived therefrom with known acceleration patterns or parameters derived therefrom of the apparatus (11–15).

5. The process according to claim 4 for monitoring a plurality of apparatuses (11–15), wherein the detected acceleration pattern or parameters of the spacecraft (10) are compared with known acceleration patterns or parameters derived therefrom of all apparatuses (11–15) and the respective operational condition of each apparatus (11–15) is determined therefrom.

6. A device for determination of the operational condition of a mechanical apparatus (11–15) mounted in or to a spacecraft (10), comprising:

an acceleration pickup (20) attachable to the spacecraft (10) for measuring the acceleration of the spacecraft (10), and an operational condition determination device (38) with a memory (40) for prestored known acceleration patterns of the apparatus (11–15), wherein the acceleration patterns or parameters derived therefrom of the spacecraft (10) detected by the acceleration pickup (20) are compared with the known acceleration patterns or parameters derived therefrom of the apparatus (11–15) from the memory (40) and the operational condition of the apparatus (11–15) is determined therefrom.

7. The device according to claim 6, wherein an acceleration pickup (20) comprises three acceleration detectors (34–36) which detect the accelerations in all three space axes.

8. The device according to claim 6, wherein for monitoring of a plurality of apparatuses (11–15) the determination device compares the acceleration patterns or parameters of the spacecraft (10) with the known acceleration patterns or parameters of the apparatuses (11–15) stored in the memory and determines therefrom the respective operational condition of each apparatus (11–15).

9. The device according to claim 6, wherein a plurality of acceleration pickups (20) are provided whose measured values are acquired and evaluated by the determination device (38) for determining the operational condition of the apparatus (11–15).

10. The device according to claim 6, wherein the determination device (38) also determines the wear condition of the apparatus (11–15) by comparing the acceleration patterns of the spacecraft (10) with the known acceleration patterns of the apparatus (11–15).

11. The device according to claim 6, wherein the determination device is capable of receiving operating data of the apparatus (11–15), which are also evaluated by the determination device (38) for determining the operational and wear conditions of the apparatus (11–15).

12. The device according to claim 6, wherein a transmission device for wireless transmission of the operational and wear conditions of the apparatus (11–15), determined by the determination device (38), to a receiving device is provided.

13. The device according to claim 6, wherein a recording device (40) for continuous recording of the acceleration values of the spacecraft (10) acquired by the acceleration pickup (20) is provided.

14. The device according to claim 6, wherein neuronal nets for comparing the acceleration patterns of the spacecraft (10) with the known acceleration patterns of the apparatus (11–15) are provided in the determination device (38).

15. A spacecraft comprising a spacecraft body (16), at least one mechanical apparatus means (11–15) mounted relative to the spacecraft (10) for generating minor accelerations when operative and no accelerations when inoperative, acceleration pickup means (20) for detecting the acceleration of the spacecraft (10) and for detecting minor accelerations of the at least one mechanical apparatus means (11–15) when operative, and means (38) for determining the operative or inoperative condition of the at least one mechanical apparatus means (11–15).

16. The spacecraft as defined in claim 15 including means for storing data of at least one of operative and inoperative conditions of the mechanical apparatus means (11–15), and said determining means (38) evaluates data signals based upon a comparison of said stored data and said acceleration signals.

* * * * *